(12) United States Patent
Nichols et al.

(10) Patent No.: US 6,985,593 B2
(45) Date of Patent: Jan. 10, 2006

(54) BAFFLE VIBRATION REDUCING

(75) Inventors: George Nichols, Dover, MA (US);
Amar G. Bose, Wayland, MA (US);
Hal P. Greenberger, Milford, MA (US)

(73) Assignee: Bose Corporation, Framingham, MA (US)

(*) Notice: Subject to any disclaimer, the term of this patent is extended or adjusted under 35 U.S.C. 154(b) by 85 days.

(21) Appl. No.: 10/226,507

(22) Filed: Aug. 23, 2002

(65) Prior Publication Data

US 2004/0035635 A1 Feb. 26, 2004

(51) Int. Cl.
*H04R 1/28* (2006.01)
*F16F 15/00* (2006.01)

(52) U.S. Cl. .................. 381/89; 381/182; 381/162; 381/186; 181/145; 181/163; 181/209

(58) Field of Classification Search ............... 381/337, 381/389, 416, 86, 87, 182, 162, 89, 186; 181/199, 206, 145, 147, 163, 209
See application file for complete search history.

(56) References Cited

U.S. PATENT DOCUMENTS

| | | | | |
|---|---|---|---|---|
| 2,768,702 A | * | 10/1956 | Lowry | 381/182 |
| 2,993,091 A | * | 7/1961 | Guss | 381/162 |
| 3,202,773 A | * | 8/1965 | Tichy | 381/162 |
| 3,688,864 A | * | 9/1972 | Reuben | 381/89 |
| 4,008,374 A | * | 2/1977 | Tiefenbrun | 381/89 |
| 4,182,931 A | * | 1/1980 | Kenner | 381/89 |
| 4,213,008 A | * | 7/1980 | Helffrich | 381/89 |
| 4,325,454 A | * | 4/1982 | Humphrey | 181/145 |
| 4,783,820 A | * | 11/1988 | Lyngdorf et al. | 381/89 |
| 4,875,546 A | * | 10/1989 | Krnan | 181/199 |
| 4,882,760 A | * | 11/1989 | Yee | 381/335 |
| 4,903,300 A | * | 2/1990 | Polk | 381/335 |
| 5,092,424 A | * | 3/1992 | Schreiber et al. | 181/199 |
| 5,253,301 A | * | 10/1993 | Sakamoto et al. | 381/89 |
| 5,537,479 A | * | 7/1996 | Kreisel et al. | 381/96 |
| 5,621,804 A | * | 4/1997 | Beppu | 381/332 |
| 5,664,020 A | * | 9/1997 | Goldfarb et al. | 381/89 |
| 5,703,337 A | * | 12/1997 | Geisenberger | 181/206 |
| 6,031,919 A | * | 2/2000 | Funahashi et al. | 181/199 |
| 6,353,670 B1 | | 3/2002 | Gasner | |
| 6,678,384 B2 | | 1/2004 | Kowaki et al. | |
| 2004/0017920 A1 | | 1/2004 | Nishikawa et al. | |
| 2004/0008859 A1 | | 11/2004 | Zhao | |

FOREIGN PATENT DOCUMENTS

EP 0 410 352 1/1991

OTHER PUBLICATIONS

D.B. Keele, Jr., "KEF Reference Series Model Four Speaker," Audio, Jun. 1996, pp. 50–55.
http://www.linkwitlab.com/woofer.htm, (Aug. 11, 2003).

* cited by examiner

*Primary Examiner*—David Martin
*Assistant Examiner*—Eduardo Colon Santana
(74) *Attorney, Agent, or Firm*—Fish & Richardson P.C.

(57) ABSTRACT

A vibration reducing apparatus comprising, a baffle subject to vibration, a first electroacoustical transducer characterized by a first mass seated in the baffle, a second electromechanical transducer mechanically connected to said first transducer or said baffle in the vicinity of the periphery of the first transducer. The rear sides of the diaphragms of the first and the second transducer are not connected to the listening area. The first transducer and the second transducer are constructed and arranged to receive a common electrical signal so that the movable element in the first transducer and the movable element in the second transducer move in phase opposition in response to the common electrical signal to significantly reduce the vibrating force imparted to the baffle.

29 Claims, 5 Drawing Sheets

BAFFLE VIBRATION REDUCING

The present invention relates in general to baffle vibration reducing and more particularly concerns novel apparatus and techniques for reducing vibration transmitted to structures attached to loudspeaker drivers.

BACKGROUND OF THE INVENTION

When an electroacoustic transducer, such as a loudspeaker driver, is mounted to a structure, such as a package shelf, the door of a vehicle, the wall of an enclosure, other wall or other baffle, where attachment is usually on the periphery of the transducer frame, an energized transducer motor develops forces in response to an energizing electrical signal. The forces generated by the motor cause the diaphragm of the transducer to move relative to the transducer frame. These forces will also be transmitted through the frame to the structure through the attachment points of the frame. Package shelves and door panels of vehicles are often made of thin material, such as thin sheet metal. Such structures typically have insufficient stiffness to resist vibration and are typically lightly damped. As a result, forces applied to the structure around modal resonance frequencies of the structure may result in excessive vibration of the structure, acoustically perceived as unwanted buzzes and rattles, or degraded frequency response of the radiated sound.

It is an important object of the invention to reduce these structurally transmitted vibrations.

SUMMARY OF THE INVENTION

According to the invention, a first electroacoustical transducer incorporating a movable diaphragm is seated in and structurally coupled to a panel. The transducer is mechanically connected to a device containing a compensating moveable mass driven out of phase with the movement of the diaphragm of the first electroacoustical transducer, to significantly reduce the resultant force applied to the panel. Typically the device with compensating mass is a second electroacoustical transducer identical to the first transducer. According to another feature of the invention, the acoustic output from the first side of the first transducer is directly coupled to a listening environment, such as a vehicle passenger compartment or living room. The acoustic output from the side of the second transducer facing away from the first transducer is also coupled to the listening environment through an acoustical element or elements such as compliant volume and/or port so that the acoustical output into the vehicle compartment from the facing away side of the second transducer is effectively in phase with the output into the vehicle compartment from the first side of the first transducer, over a desired frequency range. The acoustic elements are arranged such that the output from the away facing side of the second transducer is not acoustically coupled to the output from the second side of the first transducer or the output from the first side of the second transducer. Thus, the invention achieves both significant reduction in unwanted mechanical vibration of the supporting structure with enhanced acoustic output from the second transducer.

Other features, objects and advantages of the invention will become apparent from the following description when read in connection with the accompanying drawing in which:

DETAILED DESCRIPTION

Figure 1:
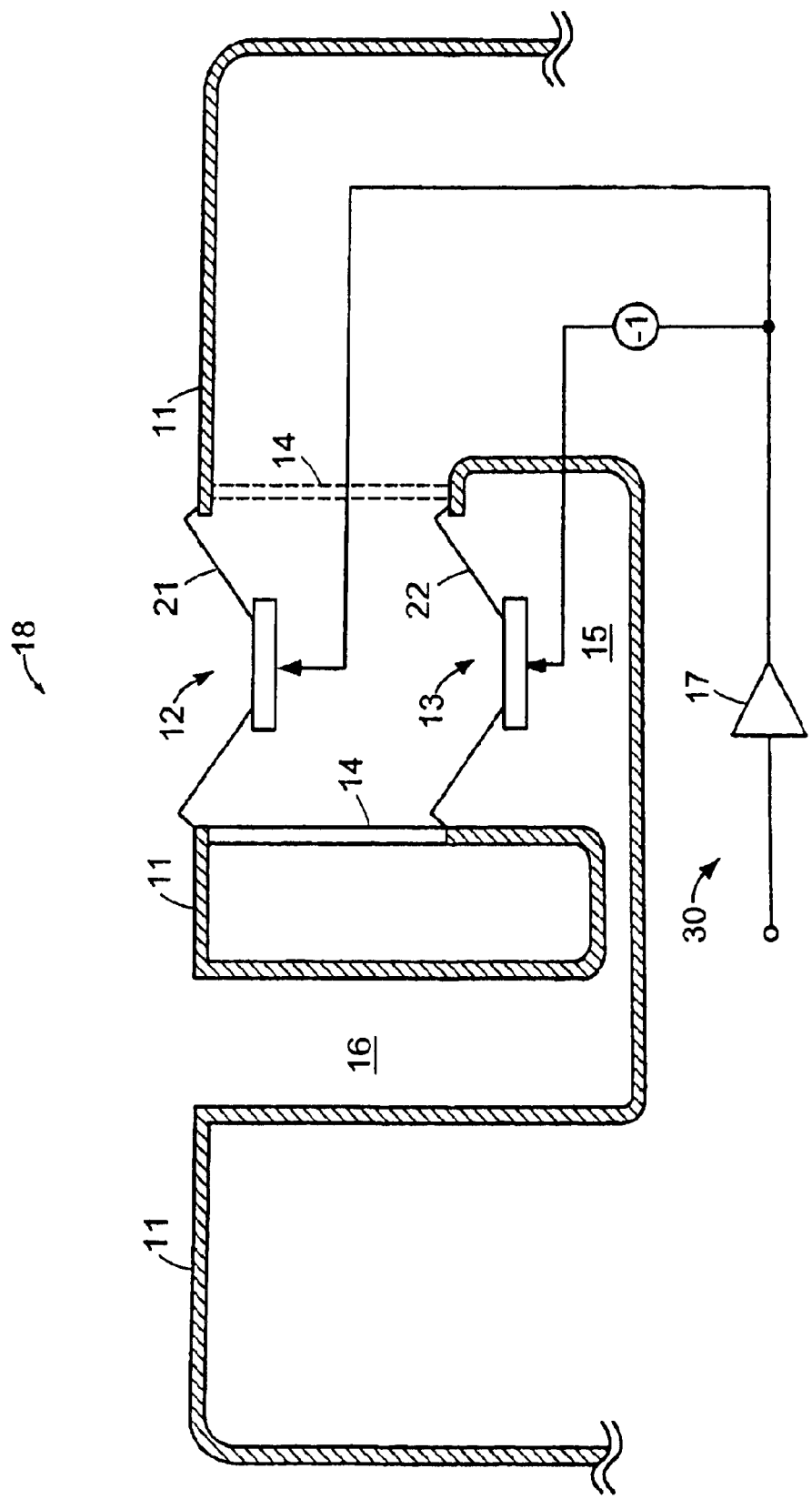
FIG. 1 is a diagrammatic representation of an embodiment of the invention with the assembly carried by an infinite baffle, such as a vehicle rear deck or door.

With reference now to the drawing and more particularly FIG. 1 thereof, there is shown a diagrammatic representation of an embodiment of the invention with structure carried by infinite baffle 11, typically a vehicle rear shelf or door panel carrying a first transducer, such as loudspeaker driver 12, mechanically connected to a second transducer, such as loudspeaker driver 13, preferably identical to loudspeaker driver 12, through mechanical link 14. The two transducers are ideally mounted in substantially parallel planes such that the diaphragms move in the same axial direction. The front side of transducer 12 is directly coupled to listening area 18. If baffle 11 is the rear package shelf of a vehicle, listening area 18 will be the passenger compartment of the vehicle. The second side of transducer 12 is coupled to volume 30, which would be the vehicle trunk if baffle 11 is the rear package shelf. The second side of diaphragm 22 of driver 13 is coupled to the listening area 18 through compliant column 15 and port tube 16. The front of diaphragm 22 of transducer 13 is coupled to volume 30. Power amplifier 17 energizes first loudspeaker driver 12 and second loudspeaker driver 13 with the same signal but drives them in opposite polarity. The system is arranged such that when diaphragm 21 of first driver 12 is moving up, diaphragm 22 of second driver 13 is moving down, which significantly reduces the forces applied to and unwanted resultant vibrations of baffle 11. Meanwhile, the output from the rear of second driver 13 is coupled by compliant volume 15 and port tube 16 for emission substantially in phase with the output from the front surface of first driver 12. The output from the rear of second driver 13 could also be coupled through a conduit of substantially constant or smoothly varying cross section to listening area 18 without loss of generality.

The second transducer need not be an identical transducer. All that is required for significant reduction in vibration is for the moving mass and generated motor force of the second transducer to approximately equal the moving mass and generated motor force of the first transducer. Such a component could be made at lower cost than the cost of a transducer identical to the first transducer. It is still desirable for the frames of the two transducers to be similar so that the second transducer maybe attached to the first transducer at the same attachment points where the first transducer is attached to the baffle. An alternative means of assembly would be to rigidly attach the top of the motor structure of the first driver 12 to the rear of the motor structure of the second driver 13, using a rigid connecting member 19 such as a threaded metal rod shown in dotted outline in FIG. 1.

Figure 3:
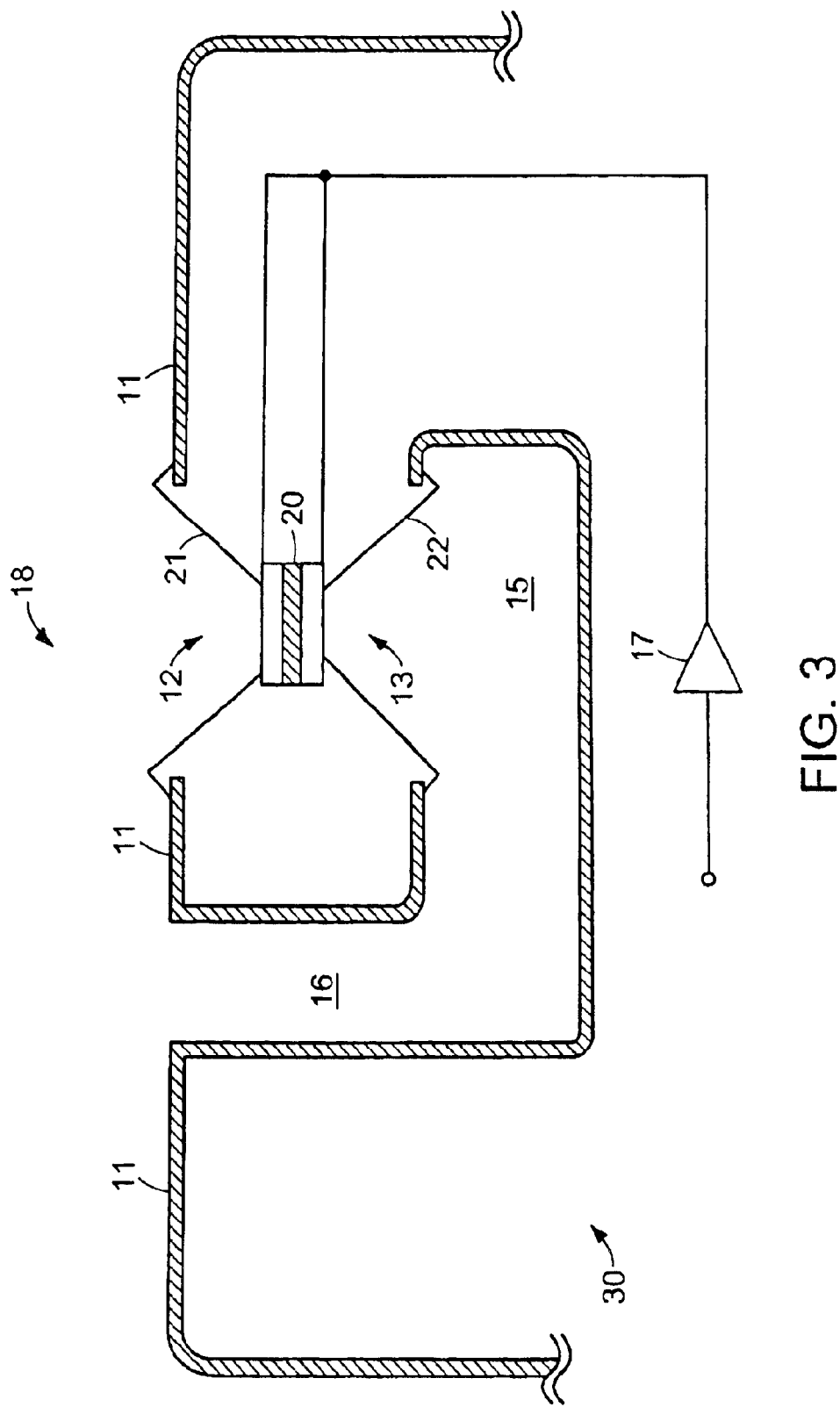
FIG. 3 is a diagrammatic representation of an alternative embodiment of the invention with the assembly carried by an infinite baffle, such as a vehicle rear deck or door.

FIG. 3 shows an alternative construction. Driver 13 is now physically inverted with respect to driver 12. FIG. 3 shows the rear of the motor structure of driver 12 rigidly attached to the rear of the motor structure of driver 13 through spacer 20, although spacer 20 is not required. Structural coupling of the two transducers could also be accomplished through attachment around the periphery of the transducer frames, as shown in the system of FIG. 1. The arrangement of FIG. 3 would also work equally well if each of transducers 12 and 13 were inverted compared to what is shown. In this case, structural connection would be more easily accomplished through attachment around the periphery of the transducer frames.

Since drivers 12 and 13 are physically inverted with respect to each other, cancellation of vibration will occur when signals of the same relative polarity are applied to each transducer. Each driver is attached to the output of amplifier 17 such that when the signal provided to driver 12 causes diaphragm 21 of driver 12 to move down, signal output from amplifier 17 which is connected to driver 13 causes diaphragm 22 of driver 13 to move up, in the opposite direction to the motion of diaphragm 21.

Above a certain frequency, output from the second transducer will not be in phase with the output from the first transducer. The frequency response of the combined system may exhibit a comb filter behavior with the first null occurring when the path length difference between the front of the first transducer and the listening position and the rear of the second transducer and the listening position is a half wavelength.

One approach for reducing the effects of this comb filter behavior is by using a low-pass filter to restrict the spectral components delivered to both drivers to spectral components below the first null and using other transducers for reproducing higher frequency spectral components. The low-pass filters used could be identical for both drivers, or they may have different orders and/or corner frequencies. The output from one of the drivers could be restricted to being below a predetermined cutoff frequency while the other was allowed to operate over a wider frequency range. Preferably, the first transducer operates over a wider frequency range than the second transducer. This result can be achieved by placing a low-pass filter in the signal path of the second transducer only, or by having a low-pass filter in the signal path of the first transducer with a higher corner frequency and/or lower order than a low-pass filter in the second transducer signal path. The result can also be achieved either in combination with or solely by the appropriate design of the acoustic elements connecting the second driver to the listening region such that the acoustic elements, in combination, form a low pass filter.

It may also be advantageous to include a low-pass filter in the signal path of the second transducer and a complementary all-pass filter in the signal path of the first transducer. A complementary all-pass filter has the same phase response as a function of frequency as a corresponding low-pass filter. This feature can be accomplished, for example, by using a second order critically damped low-pass filter in the second transducer signal path, and a first order all-pass filter in the first transducer signal path, where the corner frequencies of the low-pass and all-pass filters are substantially identical.

According to another embodiment, a fourth order low-pass filter in the second transducer signal path and a second order all-pass filter in the first transducer signal path may be used. Other examples of complementary all-pass filter/low-pass filter combinations will be evident to those skilled in the art.

The use of complementary all-pass filters and low-pass filters as described above can be combined with other signal processing as disclosed in U.S. Pat. No. 5,023,914, incorporated by reference herein, to simultaneously achieve improved system frequency response and reduce vibration.

Figure 2:
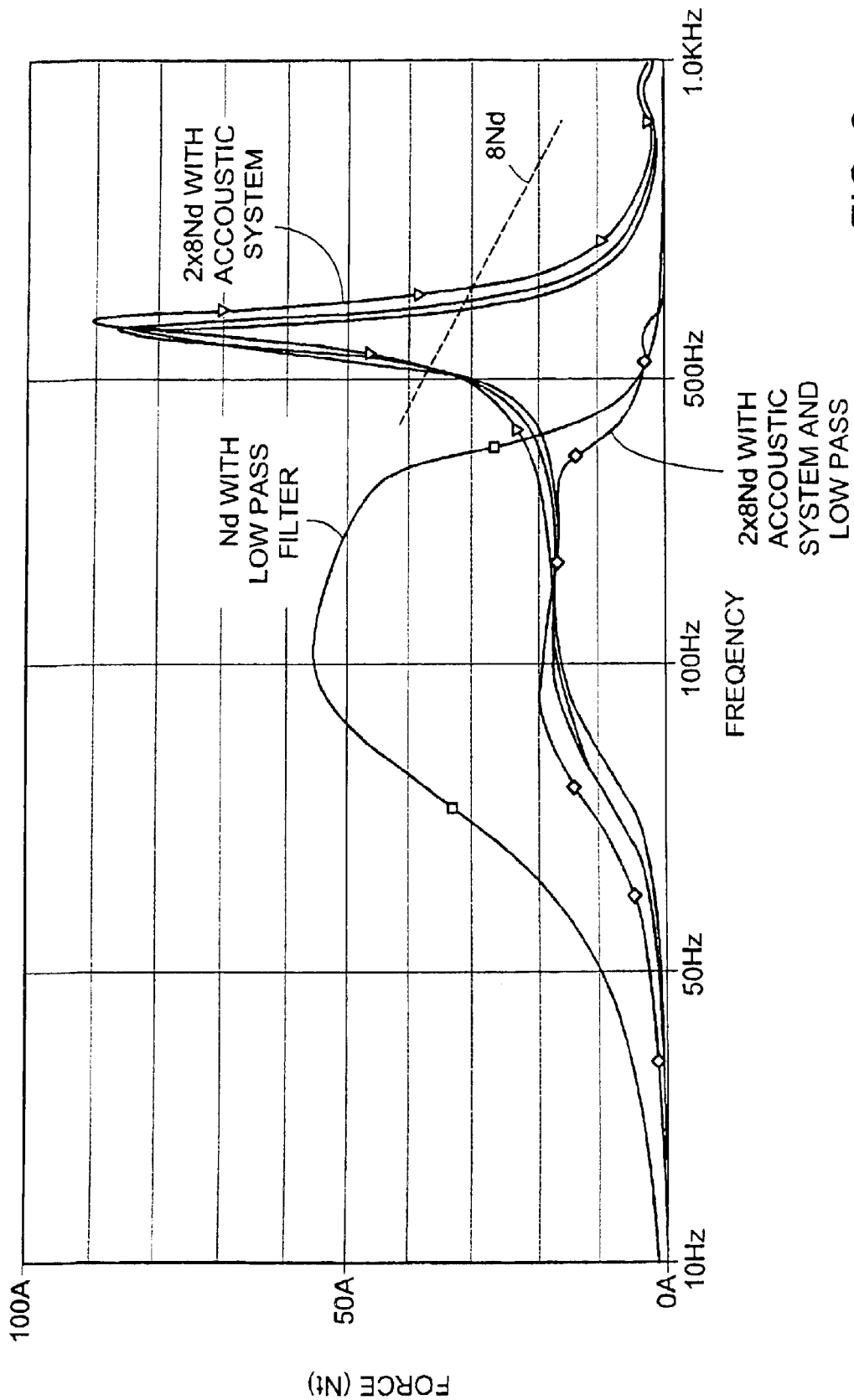
FIG. 2 is a graphical representation showing the force exerted on the structure as a function of frequency for various systems.

Referring to FIG. 2, there is shown a graphical representation of force upon a baffle as a function of frequency for various structures. Curve 21 shows the resultant response of using two Bose eight-inch Nd drivers according to the invention in an acoustic system having a low-pass filter. Curve 22 shows the applied force when using only a single eight-inch Nd driver with a low-pass filter. Curve 23 shows the applied force when using just two eight-inch Nd loudspeaker drivers connected according to the invention without the low-pass filter. Curve 24 shows the applied force with just a single eight-inch Nd loudspeaker driver. These graphical representations demonstrate the significant reduction in force applied to the baffle with the invention and the advantage of incorporating the low-pass filter into the system.

The embodiments shown in FIGS. 1 and 3 show use with infinite baffle 11. Although the arrangements are described having region 18 as the listening area, this is not required. The invention can be adapted to work equally well with volume 30 or region 18 operating as the listening area without loss of generality.

Figure 4:
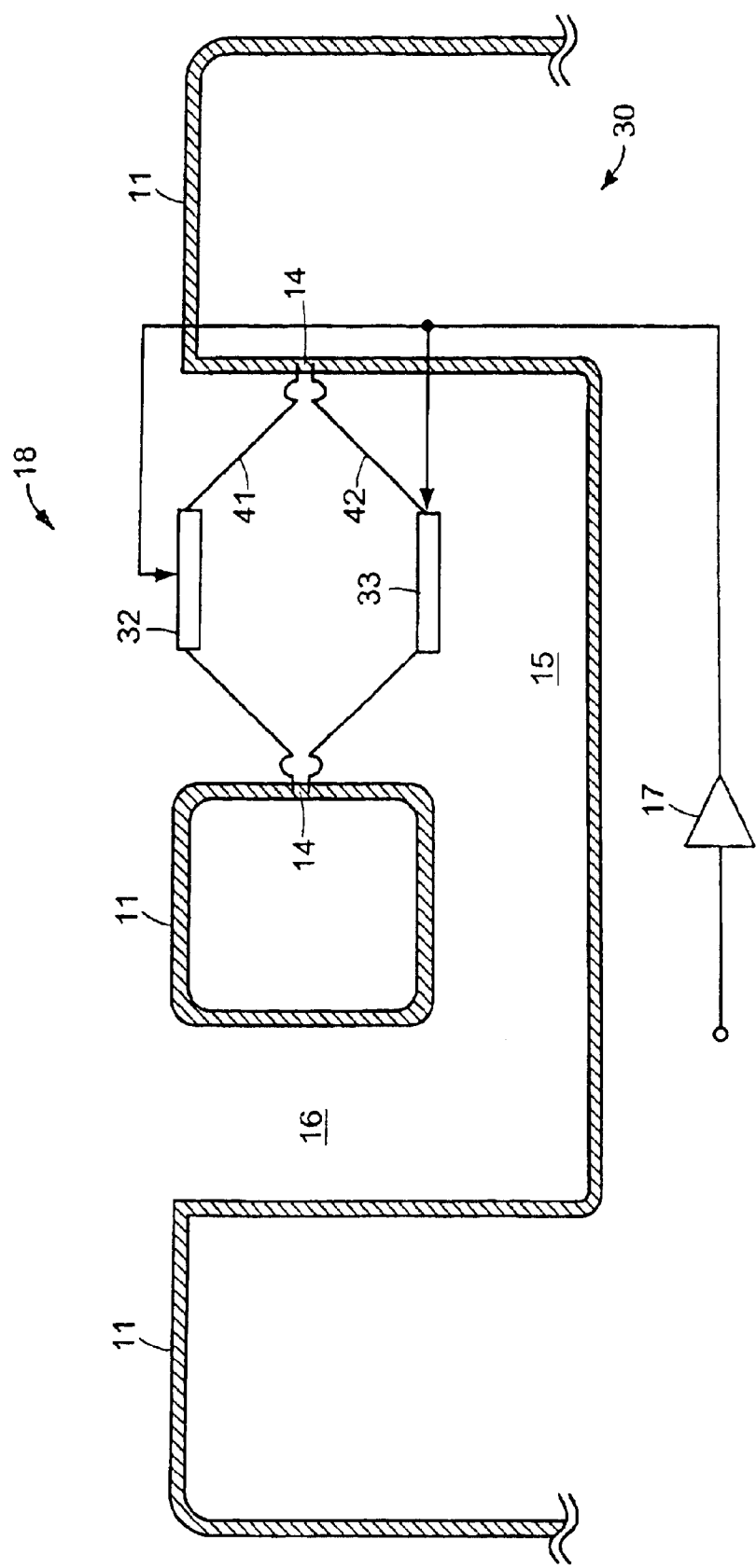
FIG. 4 is a diagrammatic representation of an alternative embodiment of the invention with the assembly carried by an infinite baffle, such as a vehicle rear deck or door, incorporating transducers with inverted motor structures.

FIG. 4 shows use of the invention with transducers of an alternate construction. FIG. 4 shows transducers 32 and 33 physically inverted with respect to each other with motor structures that are inverted with respect to the motor structures of transducers 12 and 13. Transducers 32 and 33 have diaphragms 41 and 42, respectively. Use of inverted motor structure transducers is not limited to the orientation shown. Any of the previous arrangements described for non-inverted motor transducers is also applicable for transducers with inverted motor structures. Use of inverted motor structure transducers in the current invention can significantly reduce the overall thickness of the multiple transducer assembly, which can reduce intrusion into a vehicle trunk or allow a system to fit within a wall space where an arrangement using traditional transducers would not fit. Note also that mechanical links 14 can be made much thinner than links 14 shown in FIG. 1 in the embodiment using transducers without inverted motor structures.

It is evident that those skilled in the art may now make numerous uses and modifications of and departures from the specific apparatus and techniques herein disclosed without departing from the inventive concepts. Consequently, the invention is to be construed as embracing each and every novel feature and novel combination of features present in or possessed by the apparatus and techniques herein disclosed and limited only by the spirit and scope of the appended claims.

What is claimed is:

1. Vibration reducing apparatus comprising:
    a baffle defining a mounting plane;
    a first transducer wherein said first transducer is seated in said baffle, said first transducer having a first moveable assembly, wherein said first moveable assembly comprises at least a first transducer diaphragm, wherein a first side of said first transducer diaphragm is directly acoustically coupled to a listening area and a second side of said first transducer diaphragm is coupled to a volume;
    a second transducer wherein said second transducer is mounted in a second plane different from said mounting plane defined by said baffle, said second transducer having a second moveable assembly, wherein said second moveable assembly comprises at least a second transducer diaphragm, wherein a first side of said second transducer diaphragm is coupled to said volume and a second side of said second transducer diaphragm is acoustically coupled to at least one acoustical element, wherein said at least one acoustical element is coupled to said listening area; and wherein said second transducer is mechanically coupled to said first transducer, wherein said first transducer and said second transducer are each capable of accepting a signal input, wherein said signal input causes motion of said first moveable assembly and said second moveable assembly and wherein application of said signal input results in mechanical out-of-phase relative motion of said first moveable assembly and said second moveable assembly.

2. The vibration reducing apparatus of claim 1 wherein said second transducer is arranged in an inverted position relative to said first transducer, wherein a signal input accepted by said first transducer has a same relative polarity as a signal input accepted by said second transducer.

3. The vibration reducing apparatus of claim 3 wherein, a motor structure of said second transducer is mechanically connected to a motor structure of said first transducer.

4. The vibration reducing apparatus of claim 1 wherein said second transducer is arranged in a same relative orientation as said first transducer, wherein said signal input accepted by said first transducer and said signal input accepted by said second transducer have opposite relative polarity.

5. The vibration reducing apparatus of claim 1 wherein said first and second transducers are of identical type.

6. The vibration reducing apparatus of claim 1 wherein a frame of said first transducer is mechanically connected to a frame of said second transducer.

7. The vibration reducing apparatus of claim 1 wherein a motor structure of said second transducer is mechanically connected to a motor structure of said first transducer.

8. The vibration reducing apparatus of claim 1, wherein said at least one acoustical element is a conduit.

9. The vibration reducing apparatus of claim 8, said conduit further having a constant cross-sectional area.

10. The vibration reducing apparatus of claim 8, said conduit further having a smoothly varying cross-sectional area.

11. The vibration reducing apparatus of claim 1 wherein said at least one acoustical element comprises a volume and a port, wherein said volume is acoustically coupled to said second side of said second transducer diaphragm and to said port and wherein said port is acoustically coupled to said listening area.

12. The vibration reducing apparatus of claim 1 wherein motion of said first moveable assembly generates a first acoustical output within said listening area and motion of said second moveable assembly generates a second acoustical output, wherein said at least one acoustical element transmits said second acoustical output to said listening area in phase with said first acoustical output.

13. The vibration reducing apparatus of claim 1 wherein said first transducer is configured with an inverted motor structure.

14. The vibration reducing apparatus of claim 1 wherein said second transducer is configured with an inverted motor structure.

15. The vibration reducing apparatus of claim 1 wherein the first transducer is configured with an inverted motor structure and the second transducer is configured with an inverted motor structure.

16. The vibration reducing apparatus of claim 1 further comprising: a first low pass filter coupled to said second transducer wherein said first low pass filter is configured to restrict spectral components delivered to said second transducer above a first predetermined cutoff frequency.

17. The vibration reducing apparatus of claim 16 further comprising: a second low pass filter coupled to said first transducer wherein said second low pass filter is configured to restrict spectral components delivered to said first transducer above a second predetermined cutoff frequency.

18. The vibration reducing apparatus of claim 17 wherein said first predetermined cutoff frequency os said first low pass filter and said second predetermined cutoff frequency of said second low pass filter are the same.

19. The vibration reducing apparatus of claim 16 wherein said first low pass filter is an electrical circuit.

20. The vibration reducing apparatus of claim 16 wherein said first low pass filter is an acoustical low pass filter.

21. The vibration reducing apparatus of claim 16 further comprising: an all pass filter coupled to said first transducer wherein said all pass filter is complimentary to said first low pass filter.

22. The vibration reducing apparatus of claim 1 wherein said mounting plane is substantially parallel to said second plane.

23. The vibration reducing apparatus of claim 1 further comprising:
a rigid connecting member attached to the first transducer and the second transducer.

24. A loudspeaker system comprising:
a baffle adjacent to a listening area, a source of electrical signals, a first transducer having a diaphragm, said diaphragm being moveable along a first axis, wherein said first transducer is mechanically connected to said baffle and wherein a first side of paid diaphragm is directly acoustically coupled to said listening area;
a second transducer having a mass, said mass being moveable along a second axis wherein said second axis is substantially similar to said first axis and wherein said first transducer and said second transducer are structurally coupled; and
wherein, when said source of electrical signals is electrically coupled to said first transducer and said second transducer, said first diaphragm and said mass are caused to move substantially in phase opposition thereby reducing a total force applied to said baffle by said first transducer and said second transducer.

25. A vibration reducing apparatus comprising:
a baffle defining a mourning plane;
a first transducer seated in said baffle, said first transducer having a first moveable assembly comprising at least a first transducer diaphragm wherein said first transducer diaphragm has two sides, wherein a first side of said first transducer diaphragm is directly acoustically coupled to a listening area and a second side of said first transducer diaphragm is coupled to a first volume;
a second transducer mounted in a second plane different from the plane defined by said baffle, said second transducer having a second moveable assembly characterized by a moving mass, wherein said second transducer is not acoustically coupled to said listening area; and
wherein said second transducer is mechanically coupled to said first transducer, wherein said first transducer and said second transducer are capable of accepting a signal input causing motion of said first moveable assembly and said second moveable assembly and wherein acceptance of said signal input results in mechanical out-of-phase relative motion of said first moveable assembly and said second moveable assembly.

26. The vibration reducing apparatus of claim 26 wherein a moving mass and motor force of said first transducer is equivalent to a moving mass and motor force of said second transducer.

27. A vibration reducing apparatus comprising:

a baffle defining a mounting plane;

a first transducer seated in said baffle, said first transducer having a first moveable assembly comprising at least a first transducer diaphragm, wherein a first side of said first transducer diaphragm is directly acoustically coupled to a listening area and a second side of said first transducer diaphragm is coupled to a first volume;

a second transducer mounted in a second plane different from the mounting plane defined by said baffle, said second transducer having a second moveable assembly comprising at least a second transducer diaphragm, wherein a first side of said second transducer diaphragm is coupled to a second volume and a second side of said second transducer diaphragm is acoustically coupled to at least one acoustical element, said at least one acoustical element further coupled to said listening area; and wherein said second transducer is mechanically coupled to said first transducer, wherein said first transducer and said second transducer are each capable of accepting a signal input causing motion of said first moveable assembly and said second moveable assembly and wherein acceptance of said signal input results in mechanical out-of-phase relative motion of said first moveable assembly and said second moveable assembly.

28. Vibration reducing apparatus comprising:

a baffle defining a mounting plane;

a first transducer seated in said baffle, said first transducer having a first moveable element comprising at least a first transducer diaphragm, wherein a first side of said first transducer diaphragm is directly acoustically coupled to a listening area and a second side of said first transducer diaphragm is coupled to a volume;

a second transducer mounted in a second plane different from the mounting plane defined by said baffle, said second transducer having a second moveable element comprising at least a second transducer diaphragm, wherein a first side of said second transducer diaphragm is coupled to said volume and a second side of said second transducer diaphragm is indirectly acoustically coupled to said listening area; and wherein said second transducer is mechanically coupled to said first transducer, wherein said first transducer and said second transducer are each capable of accepting a signal input causing motion of said first moveable element and said second moveable element and wherein acceptance of said signal input results in mechanical out-of-phase relative motion of said first moveable element and second moveable element.

29. The vibration reducing apparatus of claim 28 wherein a mass of said first moveable element is substantially the same as a mass of said second moveable element.

* * * * *

UNITED STATES PATENT AND TRADEMARK OFFICE
CERTIFICATE OF CORRECTION

PATENT NO. : 6,985,593 B2
APPLICATION NO. : 10/226507
DATED : January 10, 2006
INVENTOR(S) : George Nichols et al.

Figure 1A:
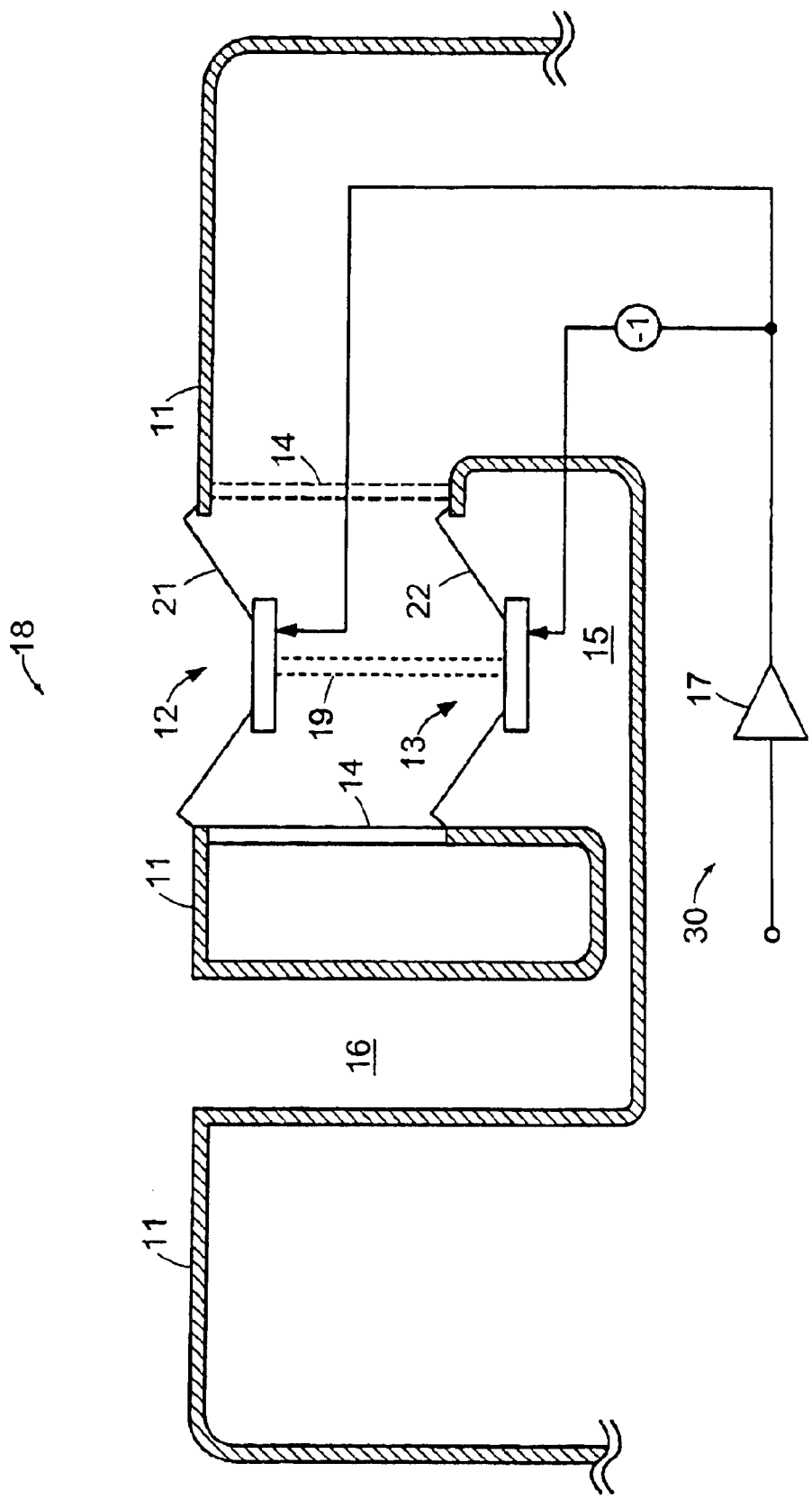

It is certified that error appears in the above-identified patent and that said Letters Patent is hereby corrected as shown below:

Column 2, line 1, insert the following paragraph:
    Fig. 1A is a diagrammatical representation of another embodiment of the invention; and
Column 2, line 30, "column" should read --volume--.
Column 2, line 54, "maybe" should read --may be--.
Column 2, line 58, "first" should read --second--.
Column 2, line 58, "12" should read --13--.
Column 2, line 59, "second" should read --first--.
Column 2, line 59, "13" should read --12--.
Column 2, line 60, "FIG. 1" should read --FIG. 1A--.
Column 6, line 8, "os" should read --of--.
In the drawings, Sheet 3, Fig. 2, the reference numeral 21 should be applied to the curve labeled 2x8Nd WITH ACOUSTIC SYSTEM AND LOW PASS.
In the drawings, Sheet 3, Fig. 2, the reference numeral 22 should be applied to the curve labeled Nd WITH LOW PASS FILTER.
In the drawings, Sheet 3, Fig. 2, the reference numeral 23 should be applied to the curve labeled 2x8Nd WITH ACOUSTIC SYSTEM.
In the drawings, Sheet 3, Fig. 2, the reference numeral 24 should be applied to the curve labeled 8Nd.

Signed and Sealed this

Twenty-second Day of August, 2006

JON W. DUDAS
*Director of the United States Patent and Trademark Office*

UNITED STATES PATENT AND TRADEMARK OFFICE
CERTIFICATE OF CORRECTION

PATENT NO.        : 6,985,593 B2
APPLICATION NO.   : 10/226507
DATED             : January 10, 2006
INVENTOR(S)       : George Nichols et al.

It is certified that error appears in the above-identified patent and that said Letters Patent is hereby corrected as shown below:

Column 5, line 17, "claim 3" should read --claim 2--.
Column 5, line 33, "claim 1, wherein" should read --claim 1 wherein--.
Column 6, line 29, "paid" should read --said--.
Column 6, line 33, "substantially" should be removed.
Column 6, line 38, "substantially" should be removed.
Column 6, line 43, "mourning" should read --mounting--.
Column 6, line 54, "not" should be removed.
Column 6, line 64, "claim 26" should read --claim 25--.

Signed and Sealed this

Fourteenth Day of November, 2006

JON W. DUDAS
*Director of the United States Patent and Trademark Office*